US008831359B2

(12) United States Patent
Schlosser et al.

(10) Patent No.: US 8,831,359 B2
(45) Date of Patent: Sep. 9, 2014

(54) APPARATUS AND METHOD FOR REFINING A VALUE OF A SIMILARITY MEASURE

(75) Inventors: Markus Schlosser, Hannover (DE); Jörn Jachalsky, Hannover (DE); Dirk Gandolph, Ronnenberg (DE)

(73) Assignee: Thomson Licensing (FR)

( * ) Notice: Subject to any disclaimer, the term of this patent is extended or adjusted under 35 U.S.C. 154(b) by 149 days.

(21) Appl. No.: 13/441,973

(22) Filed: Apr. 9, 2012

(65) Prior Publication Data

US 2012/0263386 A1 Oct. 18, 2012

(30) Foreign Application Priority Data

Apr. 14, 2011 (EP) ..................................... 11305442

(51) Int. Cl.
*G06K 9/68* (2006.01)
*G06T 7/00* (2006.01)
(52) U.S. Cl.
CPC .................................. *G06T 7/0075* (2013.01); *G06T 2207/10012* (2013.01)
USPC .......................................... 382/218; 382/154
(58) Field of Classification Search
CPC ..................................................... G06T 7/0075
USPC .................................. 382/154, 228, 220, 218
See application file for complete search history.

(56) References Cited

U.S. PATENT DOCUMENTS

| 7,330,584 | B2* | 2/2008 | Weiguo et al. | 382/154 |
| 8,488,870 | B2* | 7/2013 | Martinez-Bauza et al. | 382/154 |
| 2008/0037845 | A1* | 2/2008 | Deuerling-Zheng et al. | 382/130 |
| 2008/0317123 | A1 | 12/2008 | Kim et al. | |
| 2011/0292178 | A1* | 12/2011 | Goma et al. | 348/46 |
| 2012/0321172 | A1* | 12/2012 | Jachalsky et al. | 382/154 |
| 2013/0272582 | A1* | 10/2013 | Schlosser et al. | 382/107 |

FOREIGN PATENT DOCUMENTS

| JP | 2001148014 | 5/2001 |
| JP | 2006350465 | 12/2006 |
| WO | WO2008002271 | 1/2008 |

OTHER PUBLICATIONS

Kuk-Jin Yoon et al: "Stereo Matching with the Distinctive Similarity Measure", Computer Vision, 2007. ICCV 2007. IEEE 11th International Conference O N, IEEE, PI, Oct. 1, 2007, pp. 1-7.
Stefano L D et al: "A fast area-based stereo matching algorithm", Image and Vidion Computing, Elsevier, Guildford, GB, vol. 22, No. 12, Oct. 1, 2004, pp. 983-1005.

(Continued)

*Primary Examiner* — Samir Ahmed
(74) *Attorney, Agent, or Firm* — Jack Schwartz and Associates, PLLC

(57) ABSTRACT

An apparatus and a method for refining a value of a similarity measure are described. A similarity measure is assigned to a pixel or a group of pixels of a disparity map, which is assigned to at least two stereo images each having a plurality of pixels. The similarity measure constitutes an estimate for a match quality of the pixel or the group of pixels. For refinement of the value of the similarity measure, the similarity measure between a pixel or a group of pixels in a first stereo image and a corresponding pixel or a group of corresponding pixels in a second stereo image is determined. A contrast value for the pixel or the group of pixels of the first or the second stereo image is determined and the value of the similarity measure is corrected by a correction value that is a function of the determined contrast value.

8 Claims, 5 Drawing Sheets

(56) References Cited

OTHER PUBLICATIONS

Mohamed M A et al: "Use of Texture Filters to Improve the Quality of Digital Elevation Models Derived from Stereo Imagery" Learning from earth's shapes and sizes: IGARSS 2003, 2003 IEEE International Geoscience and Remote Symposium, Centre de Congres Pierre Baudis, Toulouse, France.

Jachalsky J et al: "Confidence Evaluation for Robust, Fast-Converging Disparity Map Refinement" Multimedia and EXPO (ICME), 2010 IEEE International Conference on, IEEE, Piscataway NJ, USA, Jul. 19, 2010, pp. 1399-1404.

European Search Report dated Sep. 21, 2011.

Tsai et al., "Fast Normalized Cross Correlation for Defect Detection", Yuan-Ze University, Chung-Li, Taiwan, pp. 1-15, Aug. 28, 2002.

* cited by examiner

APPARATUS AND METHOD FOR REFINING A VALUE OF A SIMILARITY MEASURE

This application claims the benefit, under 35 U.S.C. §119 of EP Patent Application 11305442.3, filed 14 Apr. 2011.

FIELD OF THE INVENTION

The invention relates to an apparatus and to a method for refining a value of a similarity measure.

BACKGROUND OF THE INVENTION

In 3D-TV, 3D-video and 3D-cinema, information of two or even more images is joined together for production of a spatial reproduction of image content. Typically, two stereoscopic images are used for computation of depth information, wherein a matching process is applied to find point correspondences in the two input or basic images. The displacement between two corresponding points in the basic images resulting from the different positions of the cameras when capturing the real world scene is commonly referred to as disparity. A 3D-structure, i.e. the depth information of the captured scene, may be reconstructed from these disparities by triangulation if the camera parameters are known. Depth information for the pixels in the basic images is usually integrated into a disparity map containing the result of the respective matching calculations.

The performance of the stereo matching process inherently depends on the underlying image content. Even for ideal conditions there still remain several problems, e.g. occluded areas in one of the input pictures, perspective deformations due to lens distortions, specular reflections or missing texture in some object etc., that make the matching process a challenging task. For some parts of an image it is inherently more difficult to determine accurate values for the disparity, also referred to as disparity estimates, than for others. This leads to varying levels of accuracy and reliability for the disparity estimates.

For this reason, in addition to the actual disparity value itself the reliability of a disparity estimate represents valuable information. A confidence map reflecting the estimated reliability is preferably provided along with the disparity map, wherein a confidence value is determined for every disparity value. The similarity function employed during the stereo matching may already be seen as a simple form of such a confidence measure. However, confidence values have to be reliable, too. Especially confidence values having an overestimated high level of confidence are risky.

SUMMARY OF THE INVENTION

It is an object of the invention to provide an apparatus and a method for refining a value of a similarity measure that is improved with respect to the significance of the values of the similarity measure.

According to one aspect of the invention, a method for refining a value of a similarity measure is described. A similarity measure is assigned to a pixel or a group of pixels of a disparity map, which is assigned to at least two stereo images each having a plurality of pixels. The similarity measure constitutes an estimate for a match quality of the pixel or the group of pixels. For refinement of the value of the similarity measure, an initial similarity measure between a pixel or a group of pixels in a first stereo image and a corresponding pixel or a group of corresponding pixels in a second stereo image is determined. A contrast value for the pixel or the group of pixels of the first or the second stereo image is determined and the value of the similarity measure is corrected by a correction value that is a function of the determined contrast value.

In the context of this specification, the term "similarity measure" indicates a match score or matching cost function that may exemplarily be determined by a normalized cross correlation (NCC) or a further function that is suitable for similarity measurement. Further, also in the context of this specification, the term "match quality" is the true and real match quality between the stereoscopic images, which is technically not achievable but may be estimated by help of a similarity measure. The term "correction value" is—in the context of this specification—a penalty term maintaining or diminishing the value of the similarity measure that is thereby corrected towards the true match quality.

The method according to the invention allows to detect so-called "pseudo-good matches". These are matches having an overestimated high match quality, which is solely based on the determination of the similarity measure. In truth, it was not possible to find a really good match for these matches. In other words, the match quality indicated by the determined initial similarity measure and the true match quality are expected to differ significantly from each other for these "pseudo-good matches". Often, the "pseudo-good matches" occur in an examined block of stereo images that is textured but occluded in one of the stereo images. Accordingly, since the examined block is occluded, it is physically impossible to find a true good match. To compensate for this overestimated high value of the match quality, the value of the similarity measure is corrected by the correction value, which is a penalty term correcting the similarity measure towards the true match quality. Correction of the value of the similarity measure is preferably performed by subtracting a correction value from the value of the similarity measure or by multiplying the value of the similarity measure with a respective correction value (e.g. one minus the subtractive correction value).

Advantageously, the similarity measure is re-normalized by an exponential filter before the step of correcting the value of the similarity measure. According to another aspect of the invention, the contrast value is re-normalized by an exponential filter before the step of correcting the value of the similarity measure. In addition, both, the similarity measure and the contrast value are favorably re-normalized by an exponential filter before the step of correcting the value of the similarity measure.

The method according to the invention has the advantage that it achieves a more accurate evaluation of the reliability of the disparity values or estimates in the disparity map. This is mainly due to the fact that the values of the similarity measure in the corresponding similarity map are shifted in the direction of the unknown but true match quality for the underlying stereo images.

In an empirical analysis it was found that stereo matching of textured blocks, i.e. blocks having a high contrast (which may be a high variance in luminance for black and white pictures or a high color variance for colored pictures) tend to achieve rather high matching scores even if the respective area in one of the basic images is occluded. This is a misleading result because, in principle, it should be impossible to find a good match for occluded areas. A similar overestimation in the results of the stereo matching process has been identified for slanted or non-planar objects, for which the different viewing angles of the cameras cause matching blocks to look slightly distorted.

One of the reasons for these "pseudo-good matches" are strong edges that are present in an examined block or image.

For these strong edges some somewhat similar but not truly matching edges can almost always be found in the respective other basic image. Attempts for calculating the disparities on a basis of color values instead of intensity values did not lead to completely satisfying results. Especially within the same objects, "pseudo-good matches" are still likely to be found. A further drawback is that stereo matching on color images is computationally a lot more demanding. It is also more sensitive to differences in the color temperature of the recording cameras and is likely to be disturbed by specular reflections. The method according to the invention overcomes these drawbacks. At the same time it only requires limited additional computing resources.

Favorably, the correction value maintains the value of the similarity measure if the similarity measure for the pixel or the group of pixels is located in a first predetermined continuous subset of a range for the similarity measure. The first predetermined continuous subset comprises a maximum value of the similarity measure. Advantageously, the value of the similarity measure is also maintained by the correction value if the contrast value for the pixel or the group of pixels is located in a first predetermined continuous subset of a range for the contrast value. This first subset of the contrast value comprises a minimum value of the contrast.

For an exemplary more detailed explanation, it is assumed that the similarity measure is plotted on the ordinate of a 2D-histogram while the contrast is plotted on the abscissa. The first predetermined continuous subset of the range for the similarity measure corresponds to a subset in the aforementioned histogram, and the subset expands over the complete span between the extreme values for the contrast (i.e. in a direction of the abscissa) while in the other direction, the respective subset is adjacent to a horizontal line indicating the maximum value for the similarity measure. In a direction of the ordinate, the first subset of the range for the similarity measure starts at the maximum value for the similarity measure and extends downwards to smaller values of the similarity measure until a lower threshold. Preferably, the lower threshold for the first subset of the similarity measure is defined by 90% of the maximum similarity measure. Matches having a high matching quality, i.e. near to the maximum value shall be regarded as reliable independent from their contrast value. Accordingly, the value of the similarity measure of the respective matches is left untouched.

When referring back to the aforementioned histogram, where the similarity measure is plotted in a direction of the ordinate and the contrast is plotted in a direction of the abscissa, the first predetermined continuous subset of a range for the contrast value is a subset area inside this histogram, the subset extending over the complete range between the extreme values for the similarity measure (in a direction of the ordinate) while in the perpendicular direction (in the direction of the abscissa, the contrast values) this first continuous subset starts at a minimum value for the contrast and extends in a direction of increasing values for the contrast until an upper threshold. Preferably, an upper threshold of this first continuous subset of the range of the contrast value is defined by 10% of the maximum value for the contrast.

In summary, if a pixel or a group of pixels is either assigned a low contrast value (which is located in the first predetermined subset of the contrast value) or a high similarity measure (which is located in the first predetermined subset for the similarity measure), the correction value is a 0 or near 0 penalty for the value of the similarity measure.

In other words, as a further result of the empirical analysis, the above mentioned joint distribution was developed in order to detect the "pseudo-good matches". Based on the results of this empirical analysis, a two-dimensional distribution/histogram was designed having the matching quality plotted on the ordinate and the contrast plotted on the abscissa. Due to empirical analysis it was found that all matches lying in the lower right corner of this exemplary plot correspond to unreliable "pseudo-good matches".

Preferably, the correction value diminishes the value of the similarity measure if the value of the contrast for the pixel or for the group of pixels is located in a second predetermined continuous subset of a range for the contrast value and further if the value of the similarity measure for the pixel or the group of pixels is also located in a second predetermined continuous subset of a range for the similarity measure. The second predetermined continuous subset for the contrast value comprises a maximum value for the contrast and the second predetermined continuous subset for the similarity measure comprises a minimum value of the similarity measure. For these matches, that are expected to be "pseudo-good matches", a negative correction value is introduced. This is for correcting their overestimated value of the implied match quality that is due to a misleading high value for the similarity measure. Matches that can be found in the above mentioned second continuous subsets achieve a comparably low value for the similarity measure while a high contrast is present. These matches achieve no really high value for the similarity measure despite the fact that the examined block is textured, which is indicated by the high contrast. Therefore, there is a significant probability that these matches are "pseudo-good matches".

Favorably, for a fixed similarity measure that is located outside the first subset for the range of the similarity measure, the correction value increases with increasing contrast value. On the other hand, for a fixed contrast value that is located outside the first subset for the range of the contrast value the correction value increases with decreasing similarity measure. In this way a continuous change between the two aforementioned subsets, i.e. the first subset maintaining the value of the similarity measure and the second subsets diminishing the value of the similarity measure, is achieved.

Preferably, the similarity measure is re-normalized by an exponential filter before the step of correcting the value of the similarity measure.

According to a further aspect of the invention, an apparatus for refining a value of a similarity measure is provided. The similarity measure is assigned to a pixel or a group of pixels of a disparity map, which is assigned to at least two stereo images each having a plurality of pixels. The apparatus is configured to determine a similarity measure between a pixel or a group of pixels in a first stereo image and a corresponding pixel or a corresponding group of pixels in a second stereo image. The similarity measure constitutes an estimate for a match quality of the pixel or the group of pixels. Further, the apparatus is configured to determine a contrast value for the pixel or a group of pixels of the first stereo image or the second stereo image. The apparatus is also configured to correct the value of the similarity measure by a correction value that is a function of the determined contrast value.

Same or similar advantages that have been already mentioned with respect to the method according to aspects of the invention also apply to the apparatus according to aspects of the invention.

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention as defined in the appended claims. In the figures:

DETAILED DESCRIPTION OF PREFERRED EMBODIMENTS

Figure 1:
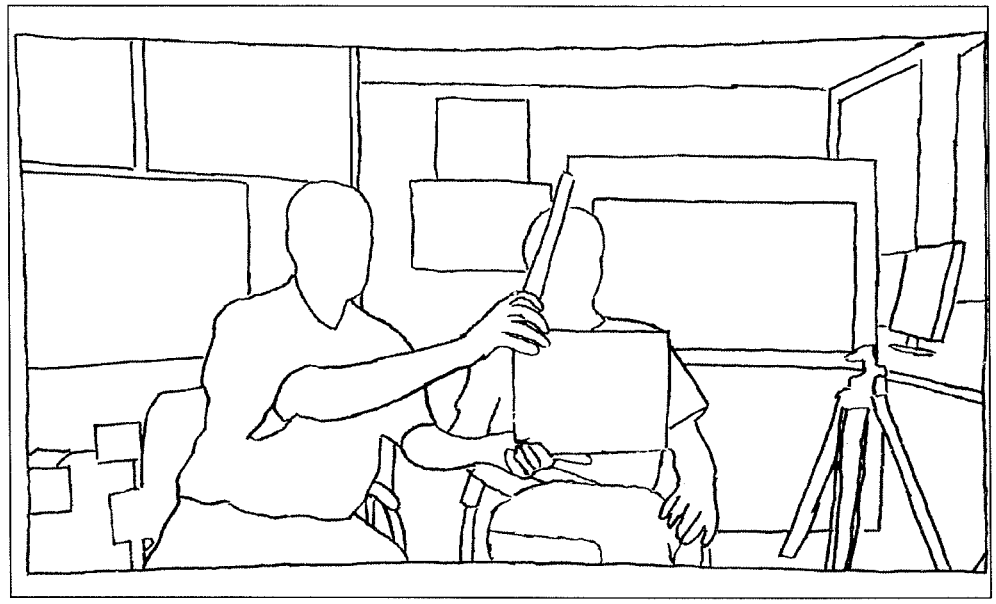
FIG. 1 shows a left picture of a stereoscopic pair of pictures.
Figure 2:
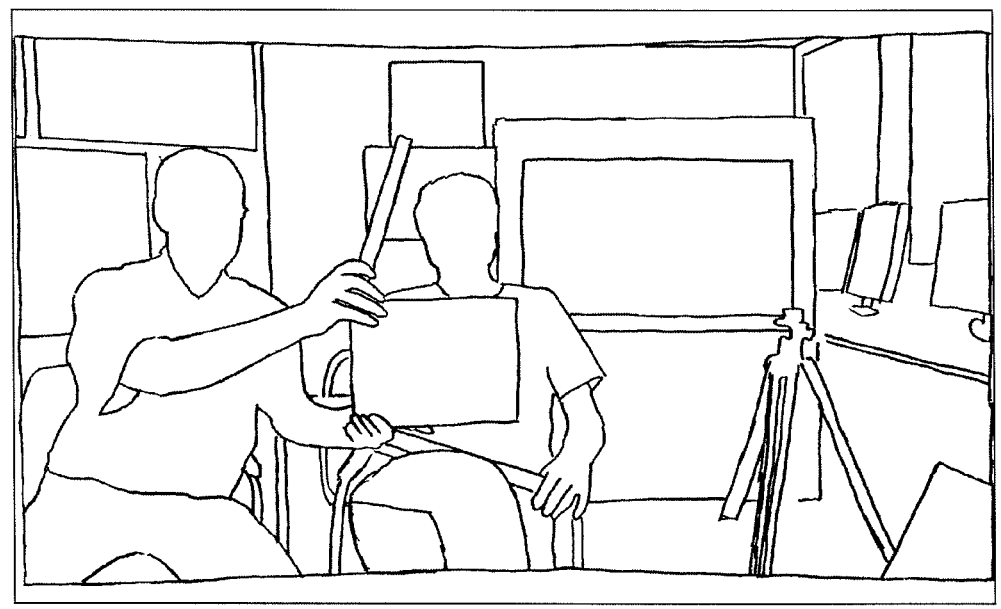
FIG. 2 depicts a right picture of a stereoscopic pair of pictures.
Figure 3:
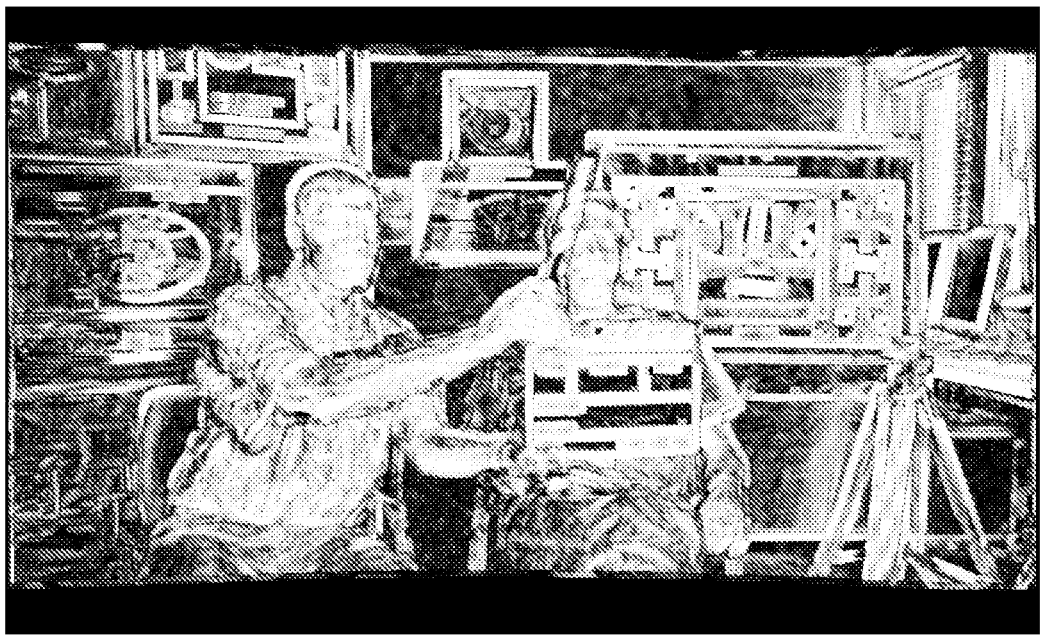
FIG. 3 shows an initial map of values of a similarity measure based solely on a left/right matching score.

FIGS. 1 and 2 show a stereoscopic pair of images. FIG. 1 is the left picture and FIG. 2 is the right picture. FIG. 3 depicts a corresponding map of values of a similarity measure indicating a matching quality of a matching process between the left picture of FIG. 1 and the right picture of FIG. 2. In FIG. 3 light pixels indicate a high match score/value for the similarity measure and dark pixels indicate a low match score. The match score represents an initial matching quality that is based on a calculated and re-normalized cross correlation between the left picture and the right picture, for example.

The similarity map in FIG. 3 comprises so called "pseudo-good matches", too. Typically, these are found in textured areas having a high contrast. When referring to black and white pictures, for example, the contrast is a variance in luminance. However, despite of the fact that the "pseudo-good matches" may be found in areas of the basic pictures (see. FIGS. 1 and 2) having a high contrast, they do not achieve a really high match score, i.e. the cross correlation is rather low. An exemplary area for such "pseudo-good matches" is the patterned portion of the left person's right arm sleeve of the shirt (see also FIGS. 1 and 2). A further area is the raised bar of the movie clapper. Another area showing "pseudo-good matches" is the occluded area at the left hand margin of the image. This area is visible in the left image (FIG. 1) but not in the right image (FIG. 2).

Figure 4:
FIG. 4 depicts a map indicating "pseudo-good matches"

FIG. 4 depicts a map indicating "pseudo-good matches". In this figure, the "pseudo-good matches" are marked by light pixels. Apparently, the abovementioned areas comprising "pseudo-good matches" have a high number of light pixels. See for example the left hand margin of the image or the bar of the movie clapper.

In the following, an exemplary embodiment of a method for identifying these "pseudo good matches" will be explained by making reference to FIGS. 5 to 9.

Figure 5:
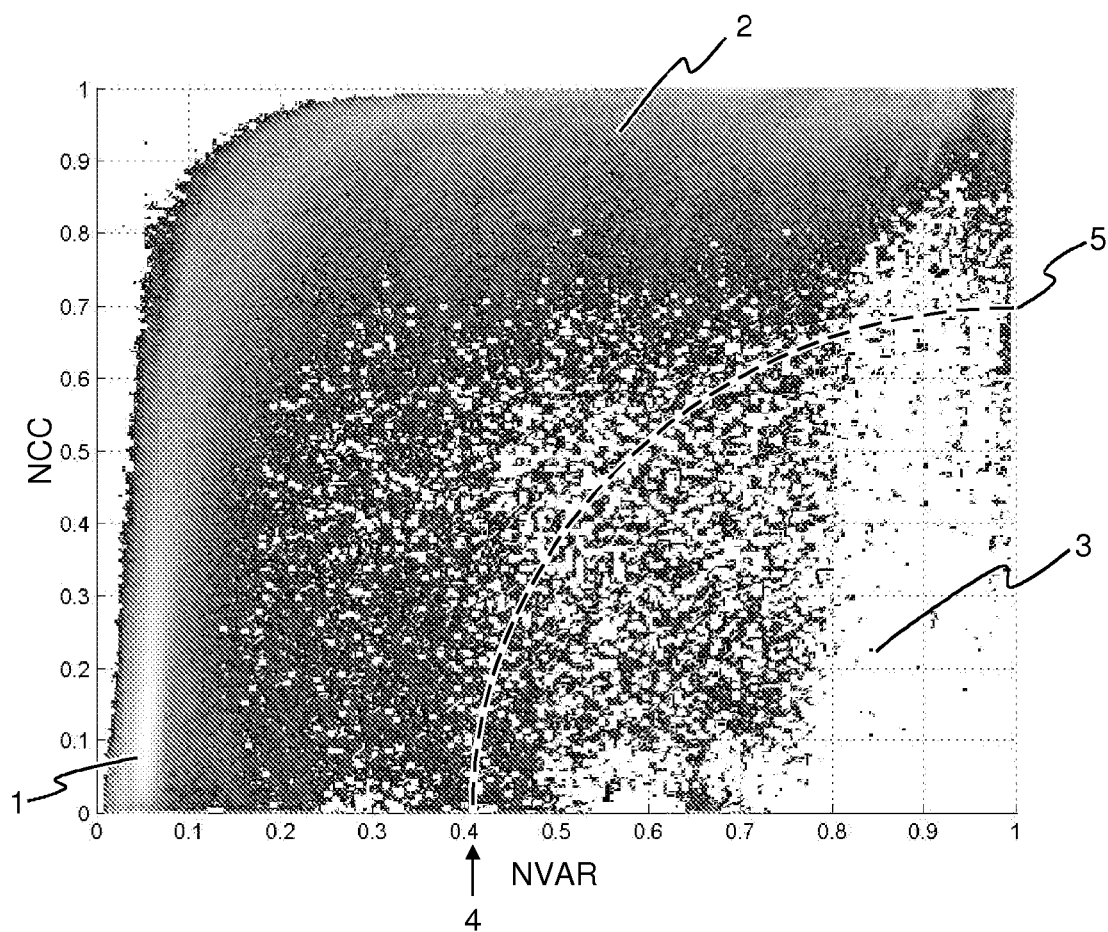
FIG. 5 shows a map for a joint distribution between a re-normalized cross correlation and a normalized variance.

FIG. 5 shows a joint distribution showing the frequency/occurrence of matches in a two-dimensional histogram. The ordinate is the re-normalized cross correlation NCC indicating a similarity measure. The abscissa is the normalized variance in luminance NVAR that is indicative of a contrast value. The frequency of matches is indicated by a grey scale intensity, wherein light areas indicate a high number of pixels and dark areas indicate a low number of pixels. The highest number of matches is found in the light area indicated by 1, which means that a high number of pixels have a low variance ($0 \leq NVAR \leq 0.1$) and a low to middle cross correlation ($0 \leq NCC \leq 0.5$). Less frequent matches are indicated by the grey field around the area 1 that ranges over the left part of the plot to the upper part of the graph and is indicated by 2. Even less frequent matches are found in a third area 3, which is delimited by the dashed line starting at a variance of about NVAR=0.4 (indicated by 4) and reaches over to the ordinate at a cross correlation value of about NCC=0.7 (indicated by 5). The delimited third area 3 is an exemplary area only. Other thresholds or other shapes of the limitation of the respective area 3 may be found.

Matches that are located in the area 3 are so-called "pseudo-good matches". They have a high variance (NVAR>=0.3) but only achieve a rather small cross correlation (NCC<=0.7). In empirical analyses it was found that these matches still have a misleading high cross correlation and typically occur in textured blocks, i.e. blocks having a high variance in luminance. Similar overestimations also occur for slanted or non-planar objects, for which the different viewing angles of the cameras cause matching blocks to look slightly distorted.

Figure 6:
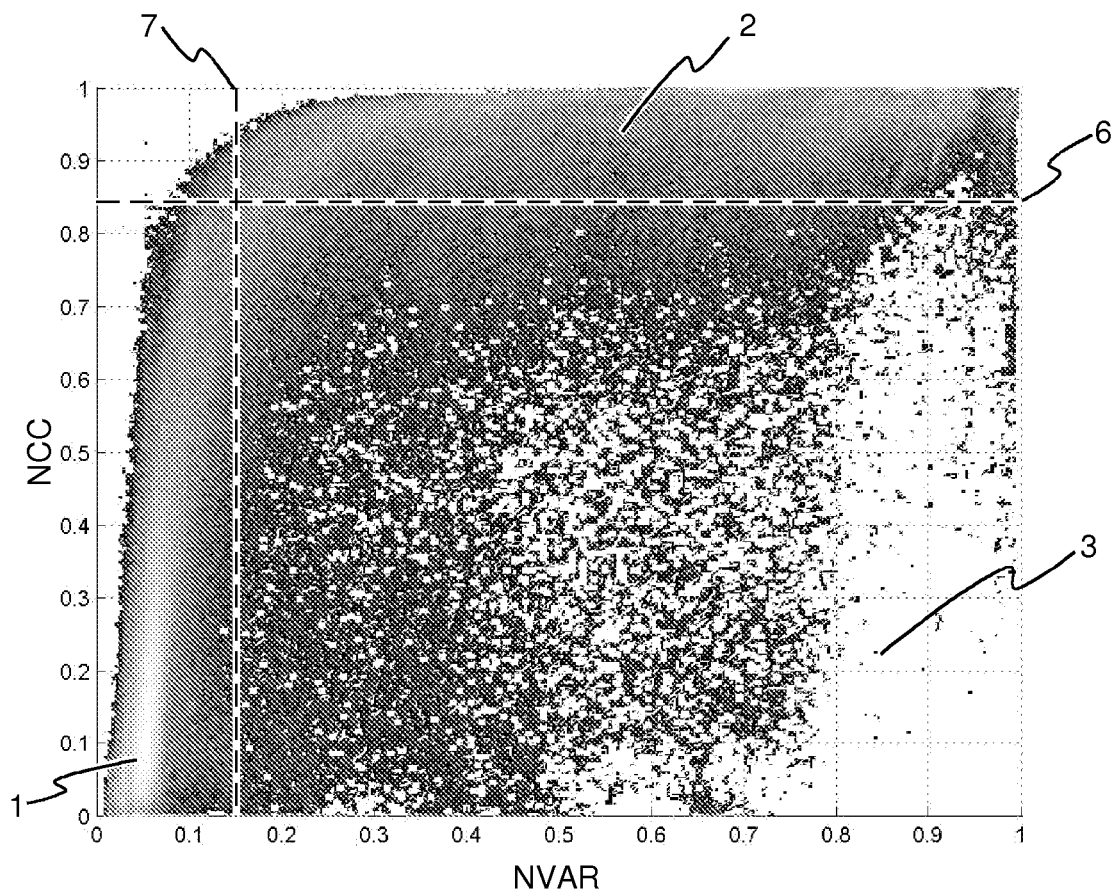
FIG. 6 shows a further map for a joint distribution between a re-normalized cross correlation and a normalized variance.

FIG. 6 is a further two-dimensional histogram showing the joint distribution of the frequency/occurrence of matches. The abscissa is the normalized variance in luminance NVAR that is indicative of a contrast value. Again, the highest number of matches is found in the light area indicated by 1. Less frequent matches are indicated by the grey field around the area 1 that ranges over the left part of the plot to the upper part of the graph and is indicated by 2. Even less frequent matches are found in a third area 3. A first subset for the range for the similarity measure, i.e. the normalized cross correlation NCC, is limited by the dashed line 6. The subset comprises the maximum cross correlation NCC=1 and extends in a direction of decreasing cross correlation until a lower threshold, which is indicated by the dashed line 6. This lower threshold may be defined by 90% of the maximum cross correlation, i.e. by NCC=0.9. According to the illustrated embodiment, the threshold is slightly lower at approximately NCC=0.84. The contrast value, i.e. the variance in luminance NVAR may be arbitrary for matches inside the first subset of the cross correlation.

In FIG. 6 there is a first subset of the variance NVAR, too. This subset comprises the minimum value for the variance in luminance, i.e. NVAR=0. The first subset of the variance extends into a direction of increasing variance up to a threshold 7, which is indicated by a dashed line. This upper threshold of the variance NVAR may be 10% of the maximum value for the variance in luminance, i.e. NVAR=0.1. However, according to the illustrated embodiment, the upper threshold of the first subset of the variance is slightly higher at about NVAR=0.15. For matches in the first subset of the variance NVAR the cross correlation NCC may be arbitrary.

The "pseudo-good matches" having a high variance (NVAR>=0.3) but no reasonable high cross correlation (NCC<=0.7) are located outside the above mentioned first subsets for the variance and the cross correlation.

For respecting the empirical analyses that these matches still have a misleading high cross correlation, a second subset may be introduced. This second subset comprises the minimum matching quality, i.e. the minimum cross correlation NCC=0 and the maximum contrast, i.e. the maximum variance NVAR=1. In other words, the second subset is the right and lower part of the histogram in FIG. 6. The subset may be limited by the threshold 7 in a direction of decreasing variance and by the threshold 6 with increasing cross correlation.

In order to correct the values of the similarity measure of the "pseudo-good matches", a penalty term is introduced, i.e. the correction value. For matches that are located inside the first subsets, i.e. matches having a correlation that is above the threshold 6 or matches having a variance that is below the threshold 7, the correction value is equal to or near to 0. In other words, the value of the similarity measure for matches inside the first subsets is maintained by the correction value. However, for matches in the second subset, the correction value diminishes the values of the similarity measure since these are "pseudo-good matches". Exemplarily, the correction value may be subtracted from the value of the similarity measure or the value of the similarity measure may be multiplied therewith.

The correction value may be discrete or continuous. While for a discrete correction value, a look-up table may be the best choice, a continuous correction value may be defined by a suitable function.

Figure 7:
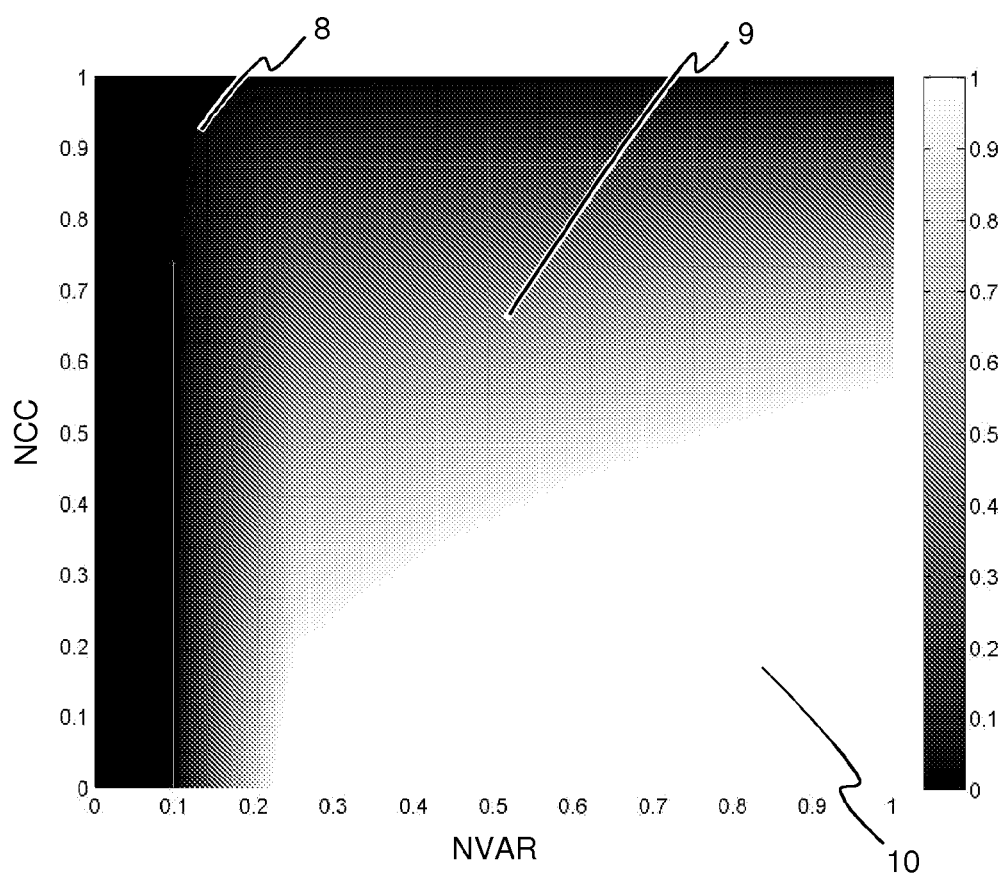
FIG. 7 depicts a map illustrating a correction value in a coordinate system similar to the system in FIGS. 5 and 6.

FIG. 7 depicts an exemplary 2D plot of the correction value. The same coordinate system that has been used for FIGS. 5 and 6 is applied. The correction value assumes a value between 0 and 1, wherein a continuous grayscale indicates the respective value of the correction value as it is indicated by the grayscale bar on the right side of the plot. The gray scale ranges from dark (equal to 0) to white (equal to 1). The designated areas 8, 9 and 10 indicate correction values assuming a value of 0 (area 8), a continuously varying value (area 9) and a value of 1 (area 10). The correcting value assumes a value of 0 or near 0 in the dark area 8. This area ranges from zero cross correlation (NCC=0) and a variance of about 0 to 0.1 (0<=NVAR<=0.1), i.e. values in an area at the left side of the plot, to a maximum cross correlation of 1 and a maximum variance of 1, i.e. values in the upper area of the 2D plot in FIG. 7. In the grey area 9 between the aforementioned zero-area 8 and the light area 10, in which the correction value assumes a value of 1 (located in the lower right portion of the 2D plot in FIG. 7), the correction value varies continuously. The area 9 ranges from a variance of about 0.2 and a corresponding cross correlation between 0 and about 0.5 (vertical part/left border of the area 9) up to a variance of 1 and a corresponding cross correlation value of about 0.7 (horizontal/upper part of the grey area 9).

FIG. 7 illustrates that for a variance value of e.g. NVAR=0.6 the correction value varies continuously from a value of 0 when starting at a high cross correlation of NCC=1 up to a value of 1 when lowering the cross correlation down to NCC=0. The same applies e.g. for a fixed cross correlation of NCC=0.2. The correction value varies continuously starting at a value of 0 up to a value of 1 when changing the corresponding variance NVAR from 0 to 1.

The values of the correction value may be stored in a lookup table. Alternatively, weighting functions may be defined as will be explained in the following.

Prior to correction of the values of the similarity measure, a re-normalization of the cross correlation is advantageously performed. Typically, the normalized cross-correlation approximately follows an exponential distribution falling off from the maximum at 1. In order to improve the quality measure/estimate of the match quality, the distribution of the cross correlation values is flattened. Similar to histogram equalization, the values are transformed with the approximated cumulative distribution function. The mapping exemplarily takes the following form:

$$NCC' = \begin{cases} \frac{2^{4 \cdot NCC} - 1}{2^4 - 1}, & \text{if } NCC > 0 \\ 0, & \text{else} \end{cases}$$

wherein NCC is the original value and NCC' is the flattened/re-normalized value.

Exemplarily, within the context of this specification, the term "normalized variance in luminance" is—if taken mathematically correct—a normalized standard deviation DEV of the luminance. However, since the variance and the standard deviation may be easily converted to each other, there is no significant difference in the technical teaching when referring to either the variance or the standard deviation. In the following, it is assumed that the term "variance in luminance" is defined by the standard deviation of the luminance.

Similar to the normalized cross correlation NCC, the distribution of the standard deviation in luminance is approximated as falling off exponentially from the maximum at 0. Further, the distribution is restricted to an interval of [0,1] by a division through 255. The final mapping takes the $$DEV' = \frac{2^{-20 \frac{DEV}{255}} - 1}{2^{-20} - 1},$$

wherein DEV is the original standard deviation and DEV' is the normalized standard deviation.

Based on these re-normalized values, "pseudo-good matches" may be determined as the product of two independent weighting functions, namely f1(NCC') and f2(DEV'), which are defined by the following sampling points with a linear interpolation in between:

f1(0)=1.5; f1(1)=0 and f2(0)=0; f2(0.1)=0; f2(0.25)=0.8; f2(1)=1.5.

The abovementioned points are motivated by the empirical result that a match constitutes a "pseudo-good match" if, and only if, the variance is large while the cross correlation is rather small.

The values of the similarity measure are altered by the correction value, however, the classification of the matches has to be restricted to the interval [0,1], as will be explained in the following:

Exemplarily, the correction value PGM is defined by:

PGM(NCC',DEV')=min(f1(NCC')×f2(DEV'),1).

The minimum function assures that the cross correlation is corrected by a maximum correction value of 1. The value of the similarity measure CM is given by:

CM(NCC',DEV')=max(NCC'−PGM(NCC',DEV'),0),
or by

CM(NCC',DEV')=NCC'×(1−PGM(NCC',DEV').

Figure 8:
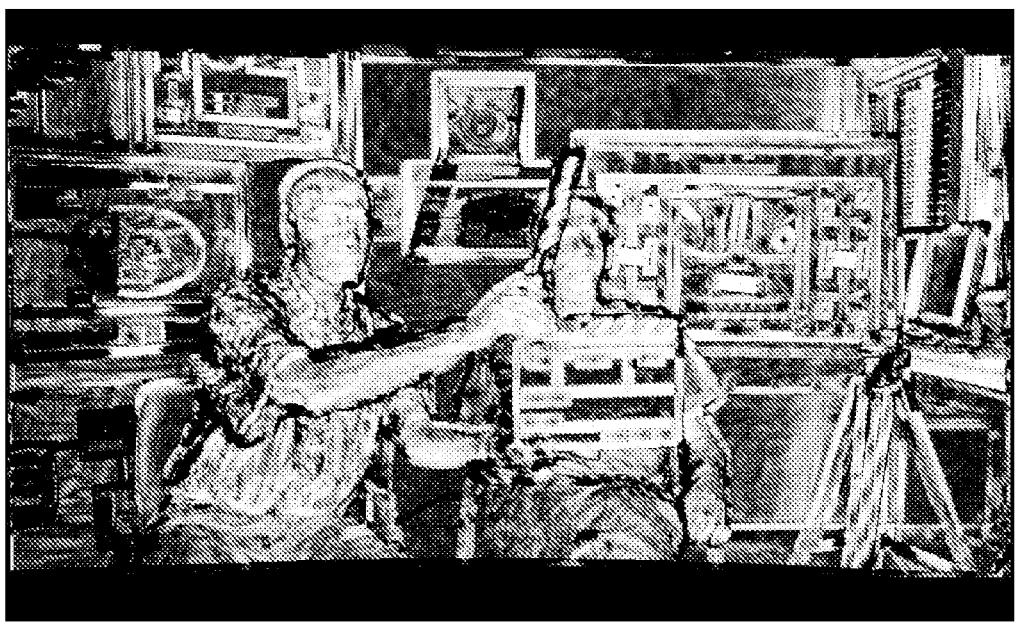
FIG. 8 shows a corrected map of values of the similarity measure.

An exemplary result for a corrected match quality estimate, i.e. a corrected similarity measure of the matching is shown in FIG. 8. All regions that have only been slightly darker than their adjacent regions in the former map of FIG. 3 become a lot darker in the corrected map of FIG. 8. Critical regions are indicated by assigning them a lower match quality value, i.e. a lower value of the similarity measure. Accordingly, the map of FIG. 8 is a much more discriminative similarity measure than the map according to FIG. 3. Major modifications may be found in the regions already mentioned with respect to FIG. 3, e.g. the patterned region of the shirt's sleeve of the left person's right arm or the raised bar of the film clap and further the occluded part in the left border region of the plot.

Although the invention has been described hereinabove with reference to a specific embodiment, it is not limited to this embodiment and no doubt further alternatives will occur to the skilled person that lie within the scope of the invention as claimed.

What is claimed is:

1. A method for refining a value of a similarity measure that is assigned to a pixel or a group of pixels of a disparity map that is assigned to at least two stereo images each having a plurality of pixels, wherein the similarity measure constitutes an estimate for a match quality of the pixel or the group of pixels, the method comprising:

determining the similarity measure between a pixel or a group of pixels in a first stereo image and a corresponding pixel or a corresponding group of pixels in a second stereo image, determining a contrast value for the pixel or the group of pixels of the first or the second stereo image, and correcting the value of the similarity measure by a correction value that is a function of the determined contrast value, wherein the value of the similarity measure is maintained if the similarity measure for the pixel or the group of pixels is located in a first predetermined continuous subset of a range for the similarity measure, the first subset comprising a maximum value of the similarity measure.

2. The method according to claim 1, wherein the value of the similarity measure is maintained if the contrast value for the pixel or the group of pixels is located in a first predetermined continuous subset of a range for the contrast value comprising a minimum value of the contrast.

3. The method according to claim 1, wherein the value of the similarity measure is diminished if the value of the contrast for the pixel or the group of pixels is located in a second predetermined continuous subset of a range for the contrast value comprising a maximum contrast and the similarity measure for the pixel or the group of pixels is located in a second predetermined continuous subset of a range for the similarity measure comprising a minimum similarity measure.

4. The method according to claim 1, wherein for a fixed similarity measure that is located outside the first subset for the range of the similarity measure, the correction value increases with increasing contrast value and for a fixed contrast value that is located outside the first subset for the range of the contrast value, the correction value increases with decreasing similarity measure.

5. The method according to claim 3, wherein a lower threshold of the second subset of the contrast is defined by 10% of the maximum value for the contrast and an upper threshold of the second subset of the similarity measure is defined by 90% of the maximum similarity measure.

6. The method according to claim 1, wherein the correction value is stored in a lookup table.

7. The method according to claim 1, wherein the value of the similarity measure comprises subtracting the correction value from the value of the similarity measure or multiplying the value of the similarity measure with the correction value.

8. An apparatus for refining a value of a similarity measure that is assigned to a pixel or a group of pixels of a disparity map that is assigned to at least two stereo images each having a plurality of pixels, wherein the similarity measure constitutes an estimate for a match quality of the pixel or the group of pixels, wherein the apparatus is configured to:

determine the similarity measure between a pixel or a group of pixels in a first stereo image and a corresponding pixel or a group of corresponding pixels in a second stereo image, determine a contrast value for the pixel or the group of pixels of the first stereo image or the second stereo image, and correct the value of the similarity measure by a correction value that is a function of the determined contrast value, wherein the value of the similarity measure is maintained if the similarity measure for the pixel or the group of pixels is located in a first predetermined continuous subset of a range for the similarity measure, the first subset comprising a maximum value of the similarity measure.

* * * * *